Patented July 24, 1951

UNITED STATES PATENT OFFICE 2,561,364

METHOD FOR PRODUCING VITAMIN $B_{12}$

Harlow H. Hall and Henry M. Tsuchiya, Peoria, Ill., assignors to United States of America as represented by the Secretary of Agriculture No Drawing. Application June 1, 1950,
Serial No. 165,604

6 Claims. (Cl. 195—96)

(Granted under the act of March 3, 1883, as amended April 30, 1928; 370 O. G. 757)

The invention herein described may be manufactured and used by or for the Government of the United States of America for governmental purposes throughout the world without the payment to us of any royalty thereon.

This invention relates to the production of vitamin $B_{12}$ by microbiological processes, more particularly to a method for producing the vitamin by cultivating a nutrient medium containing *Flavobacterium devorans*.

We have discovered that *Flavobacterium devorans*, when cultivated in a medium containing an assimilable carbon source and an assimilable nitrogen source, produces appreciable quantities of vitamin $B_{12}$. The organism produces the vitamin in appreciable amounts under a rather wide variety of conditions. In the following description, those conditions will be specified which are preferred, it being understood that the broad process is not critically limited thereby. The preference in many cases, for example, is based upon cost considerations, availability of raw material and ease of handling the medium during the fermentation and in the final recovery of the products.

The assimilable carbon source may be, for example, a carbohydrate, such as dextrose, sucrose, maltose, beet or cane molasses and the like. Of these, dextrose is preferred. The amount of assimilable carbon source may vary from 1 to 10 percent of the medium. We have found that 1 to 3 percent usually gives optimum yields.

The assimilable nitrogen source may be a proteinaceous material, such as soy meal, yeast hydrolysate, peptone and the like. We use soy meal in amounts of 1 percent or more of the medium, preferably 1 to 3 percent.

The fermentation responds most favorably with the customary nutrient salts, such as ammonium sulfate, potassium acid phosphate, magnesium sulfate and the like, preferably in combination. In addition to nutrient salts, we have discovered that the yield of viamin $B_{12}$ may be increased somewhat by the addition of vitamins, such as nicotinic acid, p-aminobenzoic acid, pantothenic acid, especially in combination. Moreover, the combination of vitamins that occur in corn steeping liquor may be substituted for the foregoing combination, and is preferred because of low cost and the advantage of the added residual beneficial material in our final vitamin product. Other vitamin containing substances may be employed, such as yeast hydrolysates.

Good results can be obtained by feeding the assimilable carbon source at intervals during the fermentation, but feeding is not strictly necessary. We prefer to carry out the fermentation under submerged aerobic conditions.

The fermentation may be carried out over a fairly broad range of hydrogen ion concentration. We prefer to initiate the fermentation with a slightly acidic medium. As the fermentation proceeds, the pH value varies, showing a net increase up to about 8.5 when the fermentation is complete. The operative range is 5.0 to 8.5, and we prefer 5.5 to 7.5 to achieve optimum results. The fermentation is usually complete within less than 96 hours. Samples of culture liquor obtained during the course of a normal fermentation are shown in the specific example which follows. The vitamin $B_{12}$ may be determined by the microbiological assay method of Skeggs et al., J. Biol. Chem. 176, 1459. The assay organism used in this case is *Lactobacillus leichmannii* ATCC 4797. Samples of fermentation media are withdrawn from the fermentor for assay during the course of the fermentation.

As previously stated, *Flavobacterium devorans* is capable of producing appreciable amounts of vitamin $B_{12}$ in a wide variety of culture conditions. The following specific example is a preferred embodiment of the invention and is not to be considered as limiting.

EXAMPLE

A nutrient medium was prepared containing the following ingredients:

| Ingredient | Amount |
|---|---|
| Glucose | per cent 2 |
| Soy meal | do 2 |
| $(NH_4)_2SO_4$ | do 0.3 |
| $KH_2PO_4$ | do 0.3 |
| $MgSO_4 \cdot 7H_2O$ | do 0.2 |
| Corn steep solids | do 1.0 |
| $CoCl_2$ | P. P. M. 1.0 |

Ten liters of this medium was inoculated with 5 percent of a 24-hr. culture of Flavobacterium devorans, the inoculum containing a trace of $CoCl_2$. The fermentation was carried out in a 30-liter vat fermenter with agitation and aeration. The temperature was maintained at about 30° C. At the intervals of time indicated in the table samples of the culture medium were withdrawn and analyzed for glucose content and assayed for vitamin $B_{12}$. The results are summarized in the table.

Table

| Time, hrs. | pH | Glucose per cent | Vitamin $B_{12}\,\mu$ |
|---|---|---|---|
| 0 | 6.6 | 2.22 | ------ |
| 16 | 6.6 | 1.73 | .085 |
| 25 | 6.4 | 1.34 | .150 |
| 40 | 6.3 | .29 | .204 |
| 49 | 7.0 | .29 | .216 |
| 64 | 7.5 | .29 | .440 |
| 73 | 8.0 | 0.13 | .416 |
| 87 | 8.5 | ------ | .576 |
| 97 | 8.6 | ------ | .184 |

Our process for fermentation lends itself to the production of a syrup or dried product containing vitamin $B_{12}$ in concentrated form. For the production of such a product in fermentation vats of pilot plant type, the fermentation is carried out essentially the same as above with the exception that a small amount, about 0.05 percent, citric acid is added to the medium to prevent precipitation of the nutrient salts during sterilization. The agitation of the medium during fermentation should be fairly vigorous, and the introduction of air may range from ½ to ¼ volume per volume of medium per minute. The rate of aeration appears not to be critical, however. After the fermentation has been complete, which occurs usually within a period of approximately 5 days or less, the fermentation medium is concentrated. The end point of the fermentation may be determined conveniently by analysis and/or assay as previously described. The medium is then evaporated to a syrup which may be used as such in feed compositions or which may be drum dried.

We claim:

1. The method which comprises cultivating *Flavobacterium devorans* in a suitable medium comprising an assimilable carbon source and an assimilable nitrogen source and recovering a product comprising vitamin $B_{12}$ from the culture medium.

2. Method of claim 1 in which the culture medium is supplemented by a vitamin-containing substance.

3. Method which comprises cultivating *Flavobacterium devorans* in a suitable medium comprising soy meal, glucose, and corn steep liquor, continuing the fermentation until appreciable amounts of vitamin $B_{12}$ have been produced, separating solids from the culture medium and evaporating the medium to produce a product rich in vitamin $B_{12}$.

4. Method which comprises cultivating *Flavobacterium devorans* in a suitable medium comprising an assimilable carbon source and an assimilable nitrogen source, continuing the fermentation for a period of 40-96 hours, and evaporating the medium to produce a product rich in vitamin $B_{12}$.

5. Method of claim 4 in which the fermentation is initiated at pH of 5.5-7.5.

6. A process of preparing a vitamin $B_{12}$ product which comprises cultivating *Flavobacterium devorans* in an aqueous medium containing the following ingredients:

| Ingredient | Unit | Amount |
|---|---|---|
| Glucose | percent about | 2 |
| Soy meal | do | 2 |
| $(NH_4)_2SO_4$ | do | 0.3 |
| $KH_2PO_4$ | do | 0.3 |
| $MgSO_4.7H_2O$ | do | 0.2 |
| Corn steep solids | do | 1.0 |
| $CoCl_2$ | P. P. M. | 1.0 | under submerged aerobic conditions with vigorous agitation at pH 5.5 to 7.5 at about 30° C. for a number of days.

HARLOW H. HALL.
HENRY M. TSUCHIYA.

REFERENCES CITED

The following references are of record in the file of this patent:

UNITED STATES PATENTS

| Number | Name | Date |
|---|---|---|
| 2,515,135 | Petty | July 11, 1950 |

OTHER REFERENCES

Ott et al., Jour. Biol. Chem., 174, July 1948, pages 1047–1048.

Stokstad et al., Op. Cit., Sept. 1949, pages 647–653.